S. C. WILSON.
EGG BEATER.
No. 75,340. Patented Mar. 10, 1868.
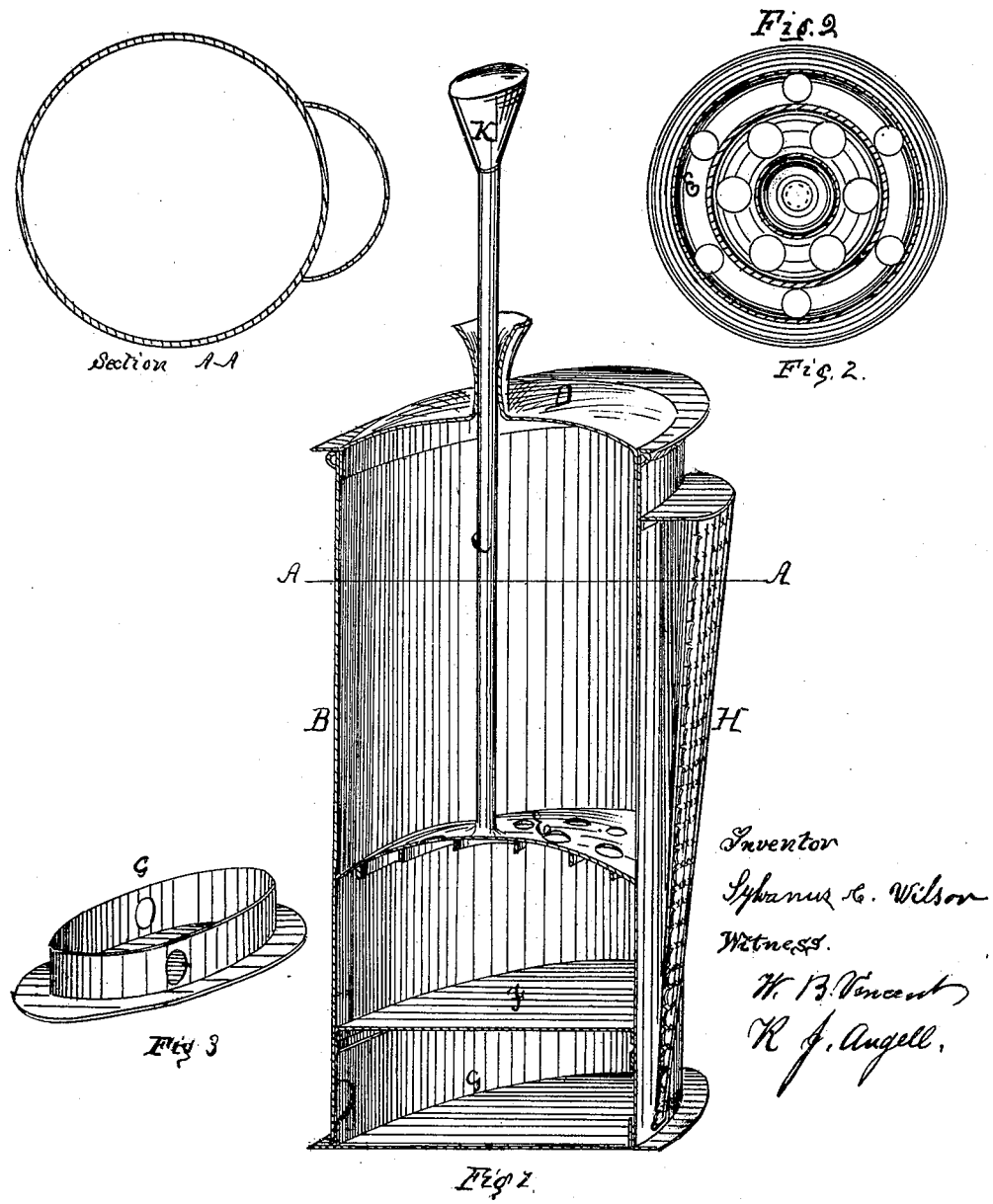

United States Patent Office.

SYLVANUS C. WILSON, OF CENTRAL FALLS, RHODE ISLAND, ASSIGNOR TO HIMSELF, EDWARDS MATHEWS, AND WILLIAM N. STRONG, OF SAME PLACE.

Letters Patent No. 75,340, dated March 10, 1868.

IMPROVED EGG-BEATER.

The Schedule referred to in these Letters Patent and making part of the same.

TO ALL WHOM IT MAY CONCERN:

Be it known that I, SYLVANUS C. WILSON, of Central Falls, in the county of Providence, and State of Rhode Island, have invented a new and improved Egg-Beater, in combination with a nutmeg-grater and biscuit or cookey-cutter; and I do hereby declare that the following specification, taken in connection with the drawings making a part of the same, is a full, clear, and exact description thereof.

Figure 1 is a sectional view of my invention.

Figure 2 is a view of the bottom of the dasher.

Figure 3 shows the biscuit or cookey-cutter detached.

The object of my invention is to produce an egg-beater, though simple in its construction, which shall be more durable than those now in use, more easily cleaned, and one which can be furnished at a less price, and at the same time to combine with it a nutmeg-grater and biscuit or cookey-cutter, thereby obviating the inconvenience often arising by reason of one or the other becoming mislaid.

The egg-beater now in common use is made of tin wire, and from the manner of its construction, gets out of repair easily, and the difficulty and expense of putting it again in order detract much from its practical value. It is also an article not easily cleaned, and one which in its operation necessarily brings into use a bowl or some other convenient dish.

The invention which is the subject of this patent, consists of a tin cylinder, B, fig. 1, of convenient size, a rod, C, passing through the cover D, and having a dasher, E, attached to its lower end, and knob K at its upper end, to enable the hand to retain its hold. The dasher E is perforated with a number of small holes, as shown in fig. 2, and has soldered upon its under surface, which is slightly concave, as shown in fig. 1, narrow strips of tin, their edges resting against the under surface of the dasher. These strips of tin may be arranged in any form upon the bottom of the dasher, the most desirable arrangement being in circles, the strip passing over the centre of the holes.

The manner of using the egg-beater is as follows: The dasher and cover are removed, and the eggs are broken into the cylinder, and rest upon the bottom, F. The dasher and cover are then replaced, and an up-and-down motion given to the dasher by the application of the hand to the knob K. The egg will be made to pass and repass through the holes in the dasher, and at the same time will be cut by the strips of tin fastened to the bottom of the same.

To the side of the egg-beater I attach an ordinary nutmeg-grater, H, and to the bottom a biscuit or cookey-cutter, G, (G' being a view of the same detached,) which shuts in at the bottom of the egg-beater after the manner of a cover, as shown in fig. 1, and is intended, when attached to the egg-beater, to hold the nutmegs.

What I claim as my invention, and desire to secure by Letters Patent, is—

A dasher attached to the lower extremity of the rod C, perforated with round holes, and having a concave surface upon which are soldered narrow strips of tin, passing across the centre of the holes, substantially as described, and for the purposes specified.

SYLVANUS C. WILSON.

Witnesses:
W. B. VINCENT,
R. J. ANGELL.